United States Patent Office 3,457,189
Patented July 22, 1969

3,457,189
FLUORIDED REFRACTORY OXIDE CATALYST AND PREPARATION THEREOF
Armand J. Derosset, Clarendon Hills, Ill., assignor to Universal Oil Products Company, Des Plaines, Ill., a corporation of Delaware
No Drawing. Filed Aug. 30, 1966, Ser. No. 575,945
Int. Cl. B01j 11/78
U.S. Cl. 252—442
10 Claims

ABSTRACT OF THE DISCLOSURE

A hydrocarbon conversion catalyst is prepared by chemically combining aluminum subfluoride vapor or silicon subfluoride vapor with a refractory inorganic oxide at a temperature of 650°–1200° C. The catalyst is useful in promoting alkylation, polymerization, isomerization and various other reactions.

---

This invention relates to the manufacture of a hydrocarbon conversion catalyst and particularly to the manufacture of a novel hydrocarbon conversion catalyst comprising a refractory inorganic oxide chemically combined with a metal subfluoride vapor.

Halogen-containing catalysts and various methods of manufacturing the same have heretofore been suggested. For example, highly active catalysts for various hydrocarbon conversion reactions have been prepared by impregnating various catalyst supports with a Friedel-Crafts metal halide by sublimation of said Friedel-Crafts metal halide, such as aluminum chloride, onto the surface of a catalyst support. However, the analogous preparation with aluminum fluoride ($AlF_3$) has not been possible since the aluminum fluoride is not volatile. The present invention is based on the discovery that especially high activity catalysts of long useful life may be prepared by a unique method of preparation as hereinafter described.

In a broad embodiment, the present invention affords a catalytic composite of a refractory inorganic oxide chemically combined with a metal subfluoride.

In another embodiment, the present invention relates to a method for manufacturing a hydrocarbon conversion catalyst which comprises chemically combining a refractory inorganic oxide with a metal subfluoride vapor at a temperature of from 650° C. to about 1200° C. and at a pressure of from about subatmospheric to about 7 atmospheres and recovering the resultant composite.

Still another embodiment of the present invention relates to a method for manufacturing a hydrocarbon conversion catalyst which comprises chemically combining a refractory inorganic oxide with aluminum monofluoride vapor at a temperature of from about 650° C. to about 1200° C. and at a pressure of from about subatmospheric to about 7 atmospheres and recovering the resultant composite.

A specific embodiment of the present invention relates to a method for manufacturing a hydrocarbon conversion catalyst which comprises chemically combining alumina with aluminum monofluoride vapor at a temperature of from about 650° C. to about 1200° C. and at a pressure of from about subatmospheric to about 7 atmospheres and recovering the resultant composite.

Other embodiments of the present invention will become apparent in considering the specification as hereinafter set forth.

As set forth hereinabove, it has been found that especially good catalysts are prepared in accordance with the novel features of the present invention. It is an object of this invention to produce a novel catalytic composition of matter possessing a high degree of activity, as well as stability. This high degree of activity renders the catalytic composition of matter especially suitable for use in the chemical and petroleum industries for the purpose of promoting a multitude of reactions including the alkylation of aromatic compounds, the transalkylation of alkyl aromatic compounds, the alkylation of isoparaffins, the polymerization of olefin-acting compounds, the isomerization of olefin-acting compounds including cyclo-olefins, destructive hydrogenation reactions, and cracking of oil heavier than gasoline into lower boiling products and particularly gasoline, including hydrocracking under hydrogen pressure. In addition, the catalyst exhibits a high degree of stability, that is, the capability of performing its intended function over an extended period of time, without the necessity for instituting frequent regenerations thereof although the catalyst is regenerable thereby further satisfying the objective of increased economy of operation.

This increased activity and stability appears to be due, at least in part, to the resulting physical state of the final catalytic composition of matter, following the use of this novel method of manufacture.

As hereinbefore set forth, the catalyst comprises a refractory inorganic oxide chemically combined with a metal subfluoride vapor. Satisfactory refractory oxides for the preparation of catalysts for use in the process of this invention include high surface area crystalline alumina modifications such as gamma-, eta- and theta-alumina, although these are not necessarily of equivalent suitability. By the term high surface area is meant a surface area measured by surface adsorption techniques within the range of from about 25 to about 500 or more square meters per gram and preferably a surface area of approximately 100 to 300 square meters per gram. In addition to the aforementioned gamma-, eta- and theta-aluminas which may be utilized as solid supports, it is also contemplated that other refractory oxides such as silica, zirconia, magnesia, thoria, etc., and combinations of refractory oxides such as silica-alumina, silica-magnesia, alumina-silica-magnesia, alumina-thoria, alumina-zirconia, etc., may also be utilized as solid supports for the catalyst of the present invention.

As set forth hereinabove, the catalyst comprises a refractory inorganic oxide that is combined with a metal subfluoride vapor to effect chemical combination of the refractory inorganic oxide with said metal subfluoride vapor. Particularly preferred metal subfluorides include the aluminum subfluorides including aluminum monofluoride and silicon subfluorides including silicon difluoride due mainly to the relative ease in preparing these compounds although the invention is not restricted to their use, but may employ any of the known metal subfluorides insofar as they are adaptable. However, it is not intended to infer that different metal subfluorides which may be employed will produce catalysts which have identical effects upon any given organic reaction as each of the catalysts produced from different metal subfluorides and by slightly varying procedures will exert its own characteristic action.

It is a feature of the present invention that the finished catalyst of the present invention prepared as hereinafter set forth has increased structural strength and a high degree of stability due to the immobility of the components of the finished catalysts inasmuch as chemical combination of the refractory inorganic oxide with the metal subfluoride vapor is accomplished as hereinafter described.

The catalyst of the present invention comprises a metal subfluoride vapor chemically combined with the refractory inorganic oxide so as to effect chemical combination of the refractory inorganic oxide with the metal subfluoride vapor, and as hereinbefore set forth, it is the particular association of these components which results in the unusual catalytic properties of this catalyst. The metal subfluoride vapor may be chemically combined with the refractory inorganic oxide at temperatures in the range of 650° C. to about 1200° C. and at a pressure of from about subatmospheric to about 7 atmospheres. The formation of the metal subfluoride vapor, and especially the formation of aluminum monofluoride is accomplished by sweeping with a gas such as helium, argon or hydrogen, and preferably helium, a stoichiometric mixture of aluminum metal (melting point about 660° C.) and aluminum trifluoride (melting point greater than 1000° C.) which is heated to about 750 to 800° C. The refractory inorganic oxide which is then chemically combined with the aluminum monofluoride is placed in the downstream helium flow. The chemical combination takes place at temperatures in excess of 650° C. Fluoride concentrations of between 0.01 percent to about 5 percent (by weight) are preferred.

In an alternative method, the catalyst may be prepared by pelleting a mixture of aluminum power with a stoichiometric excess of aluminum trifluoride, and mixing these pellets with the refractory inorganic oxide catalyst support and then heating in vacuum in a furnace tube at elevated temperatures.

The following examples are introduced for the purpose of illustration only with no intention of unduly limiting the generally broad scope of the present invention.

Example I

A quartz vessel with provisions for connection to a vacuum system was filled with a mixture of about 50 grams of $\frac{1}{16}$ inch alumina spheres and about 10 grams of $\frac{1}{8}$ inch pellets comprising about 20% aluminum metal and about 80% aluminum monofluoride by weight. The contents of the vessel were outgassed at a pressure of less than $10^{-4}$ mm. while slowly being heated in a tube furnace. Approximately 4 hours were allowed for the system to reach 600 to about 650° C. The evacuated vessel was then sealed off. The vessel was then placed in a muffle furnace at 750° C. for 1 hour and rotated slowly to aid mixing.

The sealed vessel was cooled to room temperature. After cooling, the vessel was opened in a helium dry box, the catalyst spheres were separated from the pellets and the catalyst was then placed in vessels which were then sealed. A fluoride level of about 3.2 weight percent was achieved.

Example II

In this example, a volatile fluoride (800° C.) was prepared by sweeping with helium a stoichiometric mixture of aluminum metal (melting point 660° C.) and aluminum trifluoride (melting point greater than 1000° C.) which was heated to 750–800° C. Aluminum monofluoride was then produced. A catalyst base in the form of $\frac{1}{16}$ inch alumina spheres was then placed in the downstream helium flow and the aluminum monofluoride was chemically combined with the alumina base at a temperature in excess of 650° C.

The catalyst produced by this vapor deposition and chemical combination of the aluminum monofluoride with the alumina had fluoride levels of between 0.01 and 1.1 percent by weight of fluoride chemically combined therewith.

Example III

Additional catalysts are prepared by the methods of Examples I and II when utilizing silica-alumina, and zirconia, respectively, as the catalyst base. Fluoride levels of less than about 5 weight percent are obtained when utilizing aluminum monofluoride.

I claim as my invention:

1. A method for manufacturing a hydrocarbon conversion catalyst which comprises chemically combining a refractory inorganic oxide with a fluoride selected from the group consisting of aluminum subfluoride vapor and silicon subfluoride vapor under conditions to incorporate in the catalyst from about 0.01% to about 5% by weight of fluoride, said conditions including a temperature of from about 650° C. to about 1200° C. and a pressure of from about atmospheric to about 7 atmospheres, and recovering the resultant composite.

2. The method of claim 1 further characterized in that said fluoride is aluminum monofluoride.

3. The method of claim 2 further characterized in that said refractory inorganic oxide comprises alumina.

4. The method of claim 2 further characterized in that said refractory inorganic oxide comprises silica-alumina.

5. The method of claim 2 further characterized in that said refractory inorganic oxide comprises zirconia.

6. A catalyst comprising a refractory inorganic oxide which has been chemically combined with aluminum subfluoride or silicon subfluoride and containing from about 0.01 weight percent to about 5 weight percent fluoride.

7. The catalyst of claim 6 further characterized in that said subfluoride is aluminum monofluoride.

8. The catalyst of claim 7 further characterized in that said refractory inorganic oxide comprises alumina.

9. The catalyst of claim 7 further characterized in that said refractory inorganic oxide comprises silica-alumina.

10. The catalyst of claim 7 further characterized in that said refractory inorganic oxide comprises zirconia.

References Cited

UNITED STATES PATENTS

| 3,383,431 | 5/1968 | Fishel | 252—442 XR |
| 3,388,184 | 6/1968 | Fishel | 252—441 XR |
| 3,410,789 | 11/1968 | Rausch | 252—441 XR |
| 3,410,790 | 11/1968 | Rausch | 252—441 XR |

PATRICK P. GARVIN, Primary Examiner

U.S. Cl. X.R.

252—441